United States Patent Office 2,889,112
Patented June 2, 1959

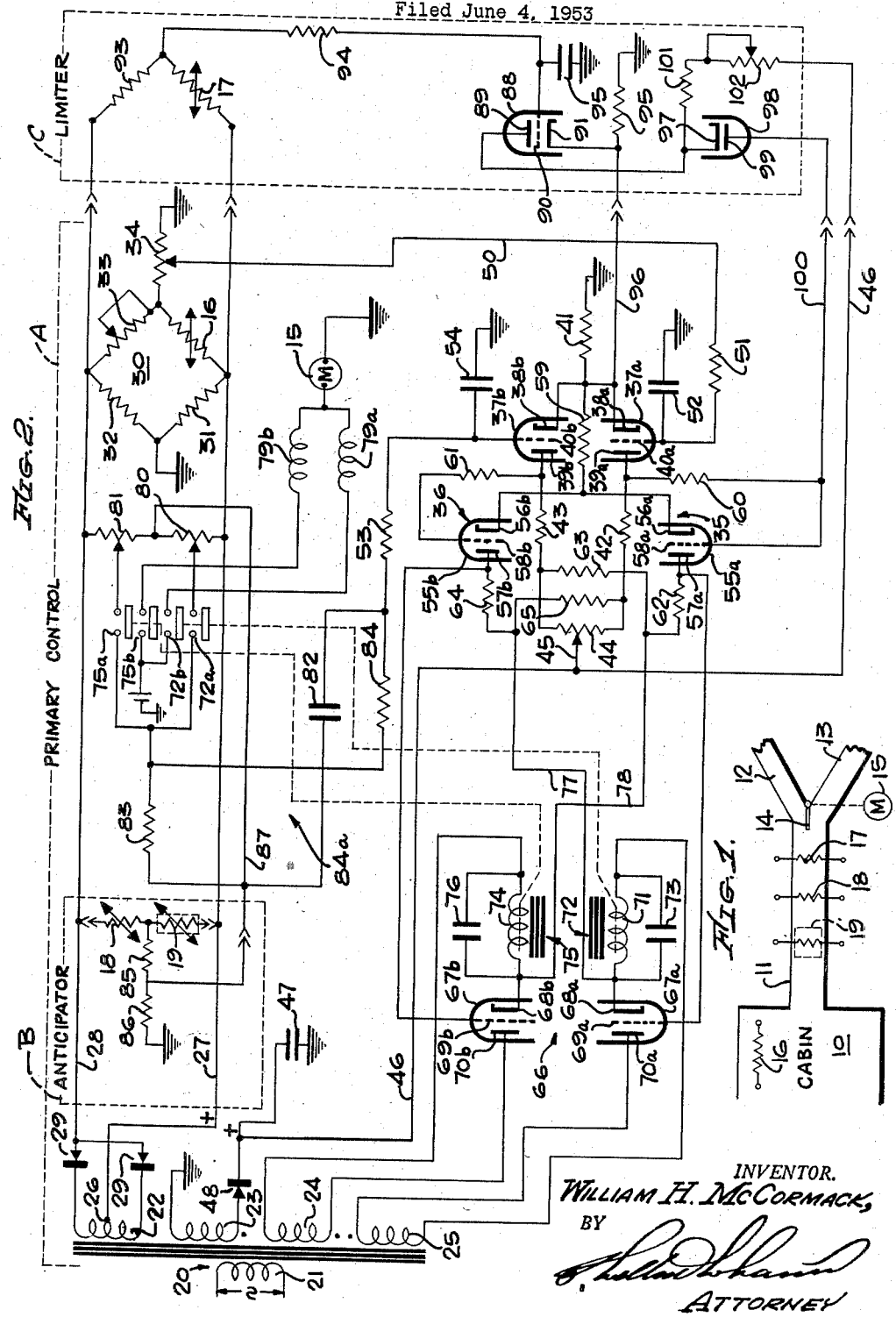

2,889,112

ELECTRONIC TEMPERATURE REGULATING APPARATUS

William H. McCormack, Torrance, Calif., assignor to The Garrett Corporation, Los Angeles Calif., a corporation of California Application June 4, 1953, Serial No. 359,594

11 Claims. (Cl. 236—9)

The present invention relates generally to regulating apparatus, and is more particularly concerned with an electronic regulator for the control of a utilization circuit by which a characteristic of a predetermined medium may be regulated in response to departures of the medium characteristics from a normal condition.

The present invention is susceptible of general application, for example, cabin temperature control, windshield, canopy or camera window temperature control where it is desired to control rate of temperature change as well as temperature, and for de-icing control where both temperature and pressure of the de-icing fluid must be kept within limits in addition to providing temperature control. It is therefore to be understood that the present invention is adapted to control other variables encountered in the regulation of fluids and it is not intended that it shall be limited to the control of the temperature only of a fluid. For instance, the regulating apparatus could be utilized to control the pressure of air or other gas in a chamber or duct by utilizing suitable pressure sensing devices of conventional construction.

For illustrative purposes herein, the invention will be described as being utilized to regulate the temperature of an aircraft compartment, such as an aircraft cabin, to which a temperature controlling medium such as air is furnished through a supply duct connected with controlled hot and cold sources, or provided with suitable heating and cooling means by which the temperature of air flowing through the duct may be varied.

It is one object of the invention to provide a self-adjusting electronic regulator in which the nominal power output is proportional to the steady state discrepancy between an existing and desired condition characteristic, such as temperature, pressure or the like; and which basically contains a lead network capable of stabilizing a small storage system, the network appearing physically as a lag network, but due to differential operation in the regulator functions as a lead network.

A further object is to provide an anticipator which may be added to the primary or basic control for stabilizing larger systems. For such purpose, longer time constant lead networks are added in the form of thermally lagged temperature variable means in combination with unlagged temperature variable means so as to indicate rates of change in temperature of the thermal source or other desired condition characteristic.

It is also an object to provide one or more limiters which are arranged to override the basic control under predetermined conditions, for example, where it is desired to maintain the state of the condition characteristic between desired limits.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a diagrammatic view illustrating an adaptation of the invention for regulating the air temperature in an airplane cabin; and Fig. 2 is a schematic view of a control system embodying the invention.

Referrnig particularly to the drawings, a typical arrangement is shown for controlling the temperature of an airplane cabin 10 to which temperature controlling air is supplied through an inlet duct 11 connected to receive hot air from a duct 12 and cold air from a duct 13. The ducts 12 and 13 are connected with suitable hot air and cold air sources respectively (not shown).

The temperature in the duct 11 is varied by proportioning the airflow from ducts 12 and 13, which may be accomplished by means of a proportioning or control valve 14 arranged to be actuated by suitable power means, shown in the present instance as being a reversible electric motor 15.

The cabin temperature is sensed by a thermistor 16 which in practice may comprise one or more electrically interconnected elements, but herein will be regarded as a single element for clarity. Other thermistors, as indicated at 17, 18 and 19 are shown as being positioned in the duct 11, the thermistor 19 differing in that it is constructed to have gerater thermal inertia, and thus reacts more slowly to temperature changes.

The regulator of the present invention has been fabricated as a "plug-in" unit in which component assemblies may be interconnected to meet different operating situations. The necessary circuitry required to match any given set of requirements is incorporated into a basic primary control A which may be utilized as a cabin or duct temperature control, with or without the addition of an anticipator B or without a temperature limiter C.

Power supply is obtained from a multi-winding power transformer 20 having a primary winding 21 which will be connected to a suitable electrical source, for example, a 115 volt, 400 cycle source, and a plurality of secondary windings 22, 23, 24 and 25, respectively.

The secondary winding 22 of the transformer 20 has a center connection 26 with a conductor 27 which forms the positive side of a supply circuit for the sensing elements. The negative side of this circuit is formed by a conductor 28 having connection with the opposite ends of the secondary winding 22 through rectifiers 29—29. The winding 22 in conjunction with the rectifiers 29 therefore provides a pulsating direct current voltage to all the temperature sensitive elements and modulation band controls, as will hereinafter be explained.

The primary control A is arranged to be basically responsive to a sensing signal originating in a conventional bridge circuit 30, the arms of this bridge being formed by a resistor 31, a resistor 32, a variable selector resistor 33, and a thermistor 16 which is located in the area, such as the cabin 10, the temperature of which is to be regulated. The bridge input is supplied from the secondary winding 22 of the transformer 20, the conductor 27 being connected to the junction of the thermistor 16 and resistor 31, while the conductor 28 is connected to the junction of the resistor 32 and selector resistor 33. The output circuit of the bridge 30 is formed by connecting the junction of resistors 31 and 32 to ground, and the junction of the thermistor 16 and selector resistor 33 to ground through a potentiometer 34 which serves as a deadband control for the regulator and determines the portion of the sensed error voltage or departure of temperature from a predetermined norm, which will be utilized in the control circuitry to be hereinafter described in detail.

Control information is impressed on a pair of parallel amplifying circuits 35 and 36 which have their outputs differentially connected. The first stages of the amplifying circuits include triodes 37a and 37b which contain cathodes 38a and 38b, plates 39a and 39b, and control grids 40a and 40b. The cathodes 38a and 38b are interconnected and grounded through a common bias resistor 41. The plates 39a and 39b are respectively connected through load resistors 42 and 43 with the opposite ends of a potentiometer 44 having an adjustable contact 45 which is connected through conductor 46 with one side of a grounded capacitor 47 and the positive side of a rectifier 48 which cooperate to provide a source of direct current high voltage plate supply. The opposite end of the winding 23 from that to which the rectifier 48 is connected is grounded.

The error signal from potentiometer 34 is carried through a conductor 50 to the grid 40a, while provision is made for impressing a pulsing signal, as will later be described in detail, upon the grid 40b. A resistor 51 and capacitor 52 are connected with the grid 40a and a resistor 53 and capacitor 54 with the grid 40b to provide low pass filters the function of which is to reject the ripple from the signal supply circuits, and further reject all outside source induced alternating current components through the use of long bridge leads.

The amplifying circuits 35 and 36 include a second set of triodes 55a and 55b which have cathodes 56a and 56b, plates 57a and 57b, and control grids 58a and 58b. The cathodes 56a and 56b are interconnected with a common cathode resistor 59 which is in turn connected with the cathodes 38a and 38b.

The grid 58a connects with the plate 39a of triode 37a through a resistor 60 which is utilized with or without added limiters as will hereinafter be described; and a similar resistor 61 is provided for maintaining balanced relationship in the connection from the plate 39b of triode 37b to the grid 58b.

The plate 57a is connected through load resistors 62 and 63 to a point in the connection between resistor 43 and potentiometer 44, while the plate 57b is connected through similar load resistors 64 and 65 to a point in the connection between resistor 42 and the potentiometer 44.

The differentially connected amplifying circuits 35 and 36 have output connections with a triggering circuit 66 which contains triodes 67a and 67b which have cathodes 68a and 68b, grids 69a and 69b and plates 70a and 70b. The plate 70a is connected to one side of transformer secondary winding 25, the other side of this winding being connected to the cathode 68a of this tube through an operating coil 71 of a relay, as generally indicated by the numeral 72, the coil being shunted by a bypass capacitor 73. The grid 69a is connected with the plate 57a of triode 55a.

The triode 67b is connected in a similar manner, its plate 70b being connected with the secondary transformer winding 24, and also connected with the cathode 68b of this tube through an operating coil 74 of a relay, generally indicated by the numeral 75, the operating coil being in this instance shunted by a bypass capacitor 76. The grid 69b of this tube similarly connects with the plate 57b of triode 55b.

The resistors 62 and 64 are chosen to provide bias voltages for the triodes 67a and 67b such that the current in the relays 72 and 75 will be less than the drop out current for the relays, when no error voltages are present on the amplifying circuits. It will be noted that the cathode 68a of triode 67a is connected by a conductor 77 to the junction between resistors 64 and 65, while the cathode 68b of triode 67b is connected by means of a conductor 78 to the junction between resistors 62 and 63. By connecting the cathodes in this manner, rather than to a reference voltage, a higher gain is secured in the regulator.

With the connections as described above, it is significant that the plate 57b will be driven less positive, when the plate 57a is driven more positive. Thus the signal voltage to the triodes 67a and 67b changes nearly twice as much as it would if the cathodes were connected to a reference potential for the same bias voltage. Also, return of each plate load to the side of potentiometer 44, near the opposite triode's grid, provides a small amount of positive feed back for additional gain through the amplifier. The potentiometer 44 provides the balance control, and is set so that the current flowing in the relays is the same when no error voltages are present on the amplifying circuits. This adjustment primarily equalizes the voltages at the plates 39a and 39b, and likewise at the grids 58a and 58b.

Each of the relays 72 and 75 is provided with a pair of contacts, relay 72 having normally open contacts 72a and 72b, and relay 75 having normally open contacts 75a and 75b. Selective closure of contacts 72b or 75b acts to energize from a suitable electrical source the motor 15, or other means for varying the temperature of air supplied to the cabin. In this case, closure of contacts 72b will energize the motor through a field coil 79a which will cause the motor to operate in such direction as to cool the temperature of admitted air, whereas closure of contacts 75b will energize the motor through field coil 79b so as to operate the motor in a direction to cause heating of the air to the cabin.

Feed-back voltage for pulsing operation is obtained from adjustable potentiometers 80 and 81 which are connected in series between conductors 27 and 28. These potentiometers have adjustable contacts respectively connected through the relay contacts 72a and 75a with one side of a resistor 83 across which a capacitor 82 and resistor 84 are series connected to form an R-C network 84a which is connected at a point in the junction between the capacitor 82 and resistor 84 with the resistor 53 in the grid circuit of grid 40b. A conductor 87 connects the junction of potentiometers 80 and 81 and the junction between resistor 83 and capacitor 82.

By selective closure of the contacts 72a and 75a, a positive or negative potential is applied to the R-C network which causes the capacitor 82 to be charged to the potential existing across the resistor 83. The settings of the potentiometers 80 and 81 determine the modulating band of the regulator or the width of the pulsing band. Full voltage is always applied for operating the valve motor 15, the application of this voltage being controlled by the relays 72 and 75 so as to be applied at a repetition rate and for a time duration which together give a duty cycle proportional to the amount of temperature deviation from normal.

In installations, where it is desired to utilize an anticipator B, the thermistors 18 and 19 located near the thermal source are connected in series between the conductors 27 and 28. The junction of the thermistors 18 and 19 is connected to ground through attenuator resistors 85 and 86. When a change of temperature occurs in duct 11, the thermal inertia of thermistor 19 being greater than that of thermistor 18, an error signal is developed at their junction and impressed upon the grid 40b of triode 37b through resistors 83, 84 and 53. The time constant or magnitude of the thermal inertia of thermistor 19 and the attenuator ratio of resistors 85 and 86 will depend upon the requirements of the installation where the temperature regulator is utilized. When utilizing the anticipator, the charge voltage for the capacitor 82 is the potential across resistor 83, which in this case will be the difference between the switched voltage from potentiometer 80 or 81, and the voltage on the anticipator attenuator. It will be noted in this case that the junction between the resistors 85 and 86 connects with the conductor 87. By thus applying voltages to each side of resistor 83, two sources of control information may be mixed without loss in sensitivity to either one.

The operation of the regulator as thus far described will now be explained. Assume that there is no error signal and that the sensing circuits are balanced, and that the regulator is properly adjusted. If the selector resistor 33 is now changed so that its resistance decreases, or similarly if the temperature in the cabin falls so as to call for heating to increase cabin temperature, a negative error voltage with respect to ground will be developed in the output of bridge 30 and impressed on the grid 40a through the potentiometer 34 and resistor 51. This negative voltage on the grid causes a decrease in plate current and as a result the potential on the plate 39a increases. Since the plate 39a is coupled to the grid 58a, the potential of the grid will also be increased. As a consequence this plate current of this tube increases and its potential decreases. Due to the differential connection between the plates 57a and 57b of the triodes 55a and 55b and utilization of a common cathode resistor 59, the plate voltage of triode 55b will increase simultaneously with the decrease in the plate voltage of triode 55a. Since the bias voltages on the grids 69a and 69b of the triodes 67a and 67b have previously been adjusted so that the current in the coils 71 and 74 of the relays is less than the drop-out current for these relays, the increased negative bias thus applied to the grid 69a of triode 67a will not cause its associated relay to operate, while the increased or positive potential applied to the grid 69b of triode 67b will make this tube more conductive.

If the error voltage is of sufficient amplitude, relay 75 will operate to close its contacts to energize the motor 15, and switch into the circuit of grid 40b a negative potential determined by the setting of the modulation band control potentiometer 81. Motor 15 operates to admit more hot air from duct 12 and close off cold air from duct 13. The capacitor 82 now charges to the potential difference between this switched voltage and the voltage from the anticipator, this difference being applied to the right-hand terminal of resistor 83 and operating to increase the charging voltage of the capacitor through resistor 84 and reduce the duration of the energized period of the motor 15, when it is moving in the before mentioned direction to increase the temperature. The anticipator circuit thus produces an antihunting effect as the normal temperature setting is approached. After a finite period of time, the potential at the capacitor 82 and at the grid 40b is sufficiently negative that the difference output at the plates 57a and 57b is too small to enable the current in triode 67b to maintain the relay 75 in contact closed position. As soon as the current is reduced to the relay drop-out value, the relay opens and the negative potential previously applied to the grid 40b is removed. The capacitor 82 now begins to discharge through the resistors 83 and 84, this discharge continuing until the output voltage applied to the grid 69b is again increased to a value which will cause relay 75 to again close its contacts. This cycle is repeated until the system unbalance and error voltage applied to the grid 40a is too small to cause the relay 75 to close. When the regulator is supplying power, the potential differences existing at the plates 57a and 57b and at the grids 40a and 40b vary between two values proportional to the relay differential (pull-in to drop-out). The regulator pulsing is thus dependent on the time constant of the R-C network 84a, and the duty cycle of the motor 15 is dependent on the relation between error and the setting of the potentiometers 80 and 81. The duty cycle of the power pulses is therefore longer at first and decreases as system balance is approached.

If the bridge circuit 30 produces a signal which calls for a decrease or lowering of temperature rather than heating as previously described, the polarity with respect to ground of the error voltages will be of opposite sign, and in this case relay 72 instead of relay 75 will be operated to produce the regulator pulsing.

From the foregoing, it will be noted that the regulator output duty cycle is proportional to the difference of the independent signals impressed on the grids 40a and 40b, and the average voltage from the R-C network 84a is such as to make the input grid potential difference equal to zero. This average voltage is developed as a "lag" and enters the amplifiers as equal and opposite to the independent signals. This lag voltage is then subtracted from the proportional independent inputs, which is in effect an addition of a "lead network" to the proportional independent inputs. The built-in "lead network" has a time constant and relative amplitude sufficient for controlling only small storage systems. For such use, the anticipator would be omitted and the resistor 86 would be shorted.

When required in particular installations, a limiter C may be added to operate with the primary control A and interconnected anticipator B, when the latter is utilized.

The limiter is illustrated as a high temperature limiter and includes a triode 88 which operates similarly to the triodes 37a and 37b, the triode 88 having a plate 89, a grid 90 and cathode 91. The control input signal is derived from a bridge including resistor 93 and thermistor 17 connected between conductors 27 and 28 and having their junction connected to the grid 90 through a low pass filter consisting of resistor 94 and capacitor 95. The sensing element of this bridge is located at the point in the system whose temperature is to be limited in the case of temperature control system, and is shown in the present instance as having the thermistor 17 located in the duct 11 by which air is supplied to the cabin 10. The cathode 91 is grounded through a bias resistor 95, and is also connected with the cathodes 38a and 38b by a conductor 96.

The plate 89 of triode 88 connects with a cathode 97 of a diode 98 which has a plate electrode 99 connected through a conductor 100 directly with the grid 58a of triode 55a. Plate 89 is connected with the plate potential supply through a resistor 101, regulating potentiometer 102, and conductor 46.

The bridge values are so selected that at the selected limiting temperature, the bridge output will be zero. The diode 98 in conjunction with the resistor 60 acts as a switch for controlling the grid 58a with an overriding signal at the limit setting. If the plate voltage of triode 88 is equal to or lower than that appearing at plate 39a, the diode conducts through the resistor 60 so that the potential drop across the resistor 60 causes a lower voltage to be applied to the control grid 58a. If the relay 72 is not already closed, this relay will be energized to connect the motor 15 so that it will operate in a direction to effect a lowering of the temperature to the limit setting. The impedance of the conducting diode and from the plate 89 to ground is sufficiently low with respect to the value of resistor 60 that the voltage appearing at the grid 58a is due almost entirely to the limiter amplifier plate voltage. When the voltage of plate 89 is higher than that of plate 39a, the diode becomes nonconducting and is essentially an infinite impedance. The voltage of grid 58a is then the same as that of the plate 39a. The output of the regulator is proportional to the limiter unbalance, when the limiter temperature is beyond that desired. When the limiter temperature is below the control point, the regulator output is proportional to the basic bridge unbalance only to the extent of deviation of the limiter from its limiting temperature.

While only one limiter has been described, it is contemplated that a plurality of limiters may be utilized, and by the use of electronic limiters such as described herein, the undesirable features of mechanical limiters and the usual "off-on" action is eliminated. Further, it is contemplated that pressure sensing elements may be utilized instead of temperature sensing elements in order to provide pressure limiting control or when a number of limiters are utilized a combination of temperature-pressure limiting control.

Various modifications may suggest themselves to those skilled in the art without departing from the spirit of my invention, and, hence, I do not wish to be restricted to the specific form shown or uses mentioned, except to the extent indicated in the appended claims.

I claim:

1. In a condition controller: first means for correcting a condition to return it to a predetermined norm from which it has departed; a pair of electronic signal amplifying circuits for controlling said first means, each of said circuits having a control electrode; means coupled to one of said electrodes for impressing a first signal voltage proportional to the departure of said condition from said norm; a capacitor connected to the other of said electrodes; a resistor in parallel with said capacitor; anticipator means for applying a second signal voltage to one end of said resistor; means connected with the other end of said resistor for applying a third signal voltage in response to the energization and deenergization of said first means; and limiting means operatively associated with said first means for overriding the control effect of said first signal under predetermined conditions of operation.

2. In a condition controller: first means selectively operable for increasing and decreasing said condition to return it to a predetermined norm from which it has departed; a pair of electronic signal amplifying circuits having their outputs differentially coupled with said first means input, each of said circuits having an electron tube containing a control grid; means connected to one of said control grids for generating a signal voltage proportional to the departure of said condition from said norm; a pulse timing voltage source containing a capacitor and resistor, the capacitor being connected to the other of said control grids so as to impress its voltage on the grid; and means for modifying the charging voltage of said capacitor depending upon the selection of said selectively operable means.

3. In a condition controller: first means for correcting a condition to return it to a predetermined norm from which it has departed, said means having predetermined energizing and deenergizing potentials; control means for said first means including a pair of circuits having outputs differentially coupled to said first means and respectively having an input; means for balancing said circuits for zero current flow at the predetermined norm of said condition; a modulating signal source; means for applying an error signal potential to one of said inputs, said signal being proportional to the magnitude of departure of said condition from normal; and means coupled with said modulating signal source for applying a signal potential therefrom to the other of said inputs of corresponding sign to said error signal to restore a balance in said circuits.

4. Apparatus for regulating a variable characteristic of a medium to maintain the characteristic at a desired normal value, comprising: selectively operable means for increasing and decreasing the magnitude of said variable characteristic; a pair of electronic controls having separate independent input circuits and having output circuits differentially connected and coupled with said selectively operable means; a primary signal source for producing an electric signal responsive to the departure of said characteristic from the desired normal value, said primary signal source being coupled with one of said independent input circuits and operating to control the selection of said selectively operable means so as to return the characteristic to said normal value; and a pulsed signal source coupled to said other independent input circuit, whereby the primary signal is varied to cause energization and deenergization of said selectively operable means at timed intervals.

5. Apparatus for regulating a variable characteristic of a medium to maintain the characteristic at a desired normal value, comprising: selectively operable means for increasing and decreasing the magnitude of said variable characteristic; a pair of electronic controls having separate independent input circuits and having output circuits differentially connected and coupled with said selectively operable means; a primary signal source for producing an electric signal responsive to the departure of said characteristic from the desired normal value, said primary signal source being coupled with one of said independent input circuits and operating to control the selection of said selectively operable means so as to return the characteristic to said normal value; and a pulsed signal source including an integrating circuit coupled to said other input circuit and energized when said means are energized, whereby the primary signal is varied to cause energization and deenergization of said selectively operable means at timed intervals.

6. Apparatus for regulating a variable characteristic of a medium to maintain the characteristic at a desired normal value, comprising: selectively operable means for increasing and decreasing the magnitude of said variable characteristic; a pair of electronic controls having separate independent input circuits and having output circuits differentially connected and coupled with said selectively operable means; a primary signal source for producing an electric signal responsive to the departure of said characteristic from the desired normal value, said primary signal source being coupled with one of said independent input circuits and operating to control the selection of said selectively operable means so as to return the characteristic to said normal value; another signal source including an integrating circuit energized when said selectively operable means are energized; and means coupling said latter signal source with said other input circuit, whereby said signal sources coact to energize said selectively operable means with energy pulses of variable frequency of repetition and variable duration in accordance with the amplitude of said primary signal.

7. Apparatus for regulating a variable characteristic of a medium to maintain the characteristic at a desired normal value, comprising: a pair of parallel amplifying circuits including a pair of first stage triodes, each having a control grid, cathode and anode, and a pair of second stage triodes each having a control grid, cathode and anode, said second stage triodes having differentially connected anode outputs; a primary signal source for producing electric signals of opposite sign depending upon the direction of departure of said characteristic from the desired normal value, said signal source being coupled to a control grid of one of the first stage triodes; and R-C circuit coupled to supply a potential to the control grid of the other first stage triode; conducting paths for respectively impressing the anode potentials of said first stage triodes on the control grids of said second stage triodes; a potential source; means for balancing the anode circuits of said first and second stage triodes for a condition of no primary signal on the grid of said first stage anode; a pair of relays controlled in response to the anode potentials of said second stage triodes, and being selectively operable depending upon the direction of departure from norm of said primary signal, said relays acting to selectively connect said R-C circuit with positive and negative sides of said potential source to energize the said coupled grid of the first stage triode with a potential of the same sign as the primary signal for restoring the balance of said amplifying circuits; and means selectively controlled by said relays for varying said characteristic in a normal restoring direction.

8. Apparatus for regulating a variable characteristic of a medium to maintain the characteristic at a desired normal value, comprising: a pair of parallel amplifying circuits including a pair of first stage triodes, each having a control grid, cathode and anode, and a pair of second stage triodes each having a control grid, cathode and anode, said second stage triodes having differentially connected anode outputs; a primary signal source for producing electric signals of opposite sign depending upon the direction of departure of said characteristic from the desired normal value, said signal source being coupled to a control grid of one of the first stage triodes; an R-C circuit coupled to supply a potential to the control grid of the other first stage triode; conducting paths for respectively impressing the anode potentials of said first stage triodes on the control grids of said second stage triodes; a resistor in each of said paths; a potential source; means for balancing the anode circuits of said first and second stage triodes for a condition of no primary signal on the grid of said first stage anode; a pair of relays respectively controlled in response to the anode potentials of said second stage triodes, and being selectively operable depending upon the direction of departure from norm of said primary signal, said relays acting to selectively connect said R-C circuit with positive and negative sides of said potential source to energize the coupled grid of the first stage triode with a potential of the same sign as the primary signal for restoring the balance of said amplifying circuits; means selectively controlled by said relays for varying said characteristic in a normal restoring direction; and limiter means connected on the grid side of the resistor in said path from the first stage triode that is coupled to the primary signal for inducing additional current flow through the resistor under predetermined conditions of operation so as to modify the potential normally impressed on the associated grid of the second stage triode due to the primary signal.

9. Apparatus for regulating a variable characteristic of a medium to maintain the characteristic at a desired normal value, comprising: a pair of parallel amplifying circuits including a pair of first stage triodes, each having a control grid, cathode and anode, and a pair of second stage triodes each having a control grid, cathode and anode, said second stage triodes having differentially connected anode outputs; a primary signal source for producing electric signals of opposite sign depending upon the direction of departure of said characteristic from the desired normal value, said signal source being coupled to a control grid of one of the first stage triodes; an R-C circuit coupled to supply a potential to the control grid of the other first stage triode; conducting paths for respectively impressing the anode potentials of said first stage triodes on the control grids of said second stage triodes; a potential source; means for balancing the anode circuits of said first and second stage triode for a condition of no primary signal on the grid of said first stage anode; a pair of relays respectively controlled in response to the anode potentials of said second stage triodes, and being selectively operable depending upon the direction of departure from norm of said primary signal, said relays acting to selectively connect said R-C circuit with positive and negative sides of said potential source to energize the said coupled grid of the first stage triode with a potential of the same sign as the primary signal for restoring the balance of said amplifying circuits; means selectively controlled by said relays for varying said characteristic in a normal restoring direction; and a potential source connectible with said R-C circuit for modifying the potential supplied to said coupled grid of the first stage triode under predetermined conditions of operation.

10. Apparatus for regulating a variable characteristic of a medium to maintain the characteristic at a desired normal value, comprising: selectively operable means for increasing and decreasing the magnitude of said variable characteristic; a pair of electronic controls having separate independent input circuits and having output circuits differentially connected and coupled with said selectively operable means, one of said input circuits including a first triode and a second triode, each having a control grid, cathode and a plate, the plate of the first triode being coupled through a resistor to the control grid of the second triode; a primary signal source for producing an electric signal responsive to the departure of said characteristic from the desired normal value, said primary signal source being coupled with the control grid of said first triode and operating to control the selection of said selectively operable means so as to return the characteristic to said normal value; a pulsed signal source coupled to the other input circuit, whereby the primary signal is varied to cause energization and deenergization of said selectively operable means at timed intervals; a limit control signal source; a current flow circuit including said resistor; and a diode for controlling said current flow circuit, one element of said diode having a potential determined by the voltage at the plate of said first triode, and the other element of said diode having a potential under the control of said limit control signal, and said diode being connected so as to conduct when the potential of said last mentioned element is less than the potential of the first mentioned element.

11. Apparatus for regulating a variable characteristic of a medium to maintain the characteristic at a desired normal value, comprising: selectively operable means for increasing and decreasing the magnitude of said variable characteristic; a pair of electronic controls having separate independent input circuits and having output circuits differentially connected and coupled with said selectively operable means, one of said input circuits including a first triode and a second triode, each having a control grid, cathode and plate, the plate of the first triode being coupled through a resistor to the control grid of the second triode; a primary signal source for producing an electric signal responsive to the departure of said characteristic from the desired normal value, said primary signal source being coupled with the control grid of said first triode and operating to control the selection of said selectively operable means so as to return the characteristic to said normal value; a pulsed signal source coupled to the other input circuit, whereby the primary signal is varied to cause energization and deenergization of said selectively operable means at timed intervals; a third triode having a control grid, cathode and plate; a limit control signal source coupled with the control grid of said third triode; a plate potential circuit connected to the plate of said third triode; and a diode having one of its elements connected with the control grid of said second triode and its other element connected with the plate of said third triode, said diode being connected for current flow in a direction from said one of its elements to said other element when the potential of the latter element is less than that of the former element, whereby said diode during conduction connects the control grid of the second triode for overriding control by the limit control signal.

References Cited in the file of this patent

UNITED STATES PATENTS

| 2,261,343 | DeFlorez | Nov. 4, 1941 |
| 2,403,917 | Gille | July 16, 1946 |
| 2,449,476 | Harrison | Sept. 14, 1948 |
| 2,455,654 | Browne | Dec. 7, 1948 |
| 2,535,133 | Hoch | Dec. 26, 1950 |
| 2,558,850 | Hofstadter | July 3, 1951 |
| 2,593,897 | Knudsen | Mar. 14, 1952 |
| 2,603,422 | Sargeaunt | July 15, 1952 |
| 2,632,846 | Hornfeck | Mar. 24, 1953 |
| 2,658,167 | Harris | Nov. 3, 1953 |
| 2,703,679 | Shank et al. | Mar. 8, 1955 |